United States Patent [19]
Hansen et al.

[11] 3,757,210
[45] Sept. 4, 1973

[54] APPARATUS AND METHOD FOR TESTING THE AMOUNT OF DEPOSITION IN AN AQUEOUS SYSTEM
[75] Inventors: Gerald D. Hansen, Holicong, Pa.; Paul C. Dryden, Urbana, Ill.
[73] Assignee: Betz Laboratories, Inc., Trevose, Pa.
[22] Filed: Mar. 9, 1972
[21] Appl. No.: 233,028

[52] U.S. Cl. ............................. 324/61 R, 324/65 CR
[51] Int. Cl. ............................................. G01r 27/02
[58] Field of Search ............. 324/61 R, 61 P, 65 CR

[56] References Cited
UNITED STATES PATENTS
3,665,301  5/1972  Maltby .............................. 324/61 P
2,838,378  6/1958  Shawhan ....................... 324/61 R X
3,238,452  3/1966  Schmitt et al. .................... 324/61 P Primary Examiner—Stanley T. Krawczewicz
Attorney—Alexander D. Ricci et al.

[57] ABSTRACT

To determine the amount of deposition taking place in an aqueous solution which deposits scale or other deposits on the vessels in which it is used, a measurement electrode is placed in the aqueous solution so that it also is subject to deposition. A symmetrical wave electrical signal is impressed between the electrode and the body of the vessel containing the aqueous solution. An output signal is generated which is modified by the dielectric deposit on the electrode and is measured to determine the variation in capacitance between the electrode and aqueous system, thereby providing an indication of the magnitude of the deposit on the electrode.

10 Claims, 6 Drawing Figures

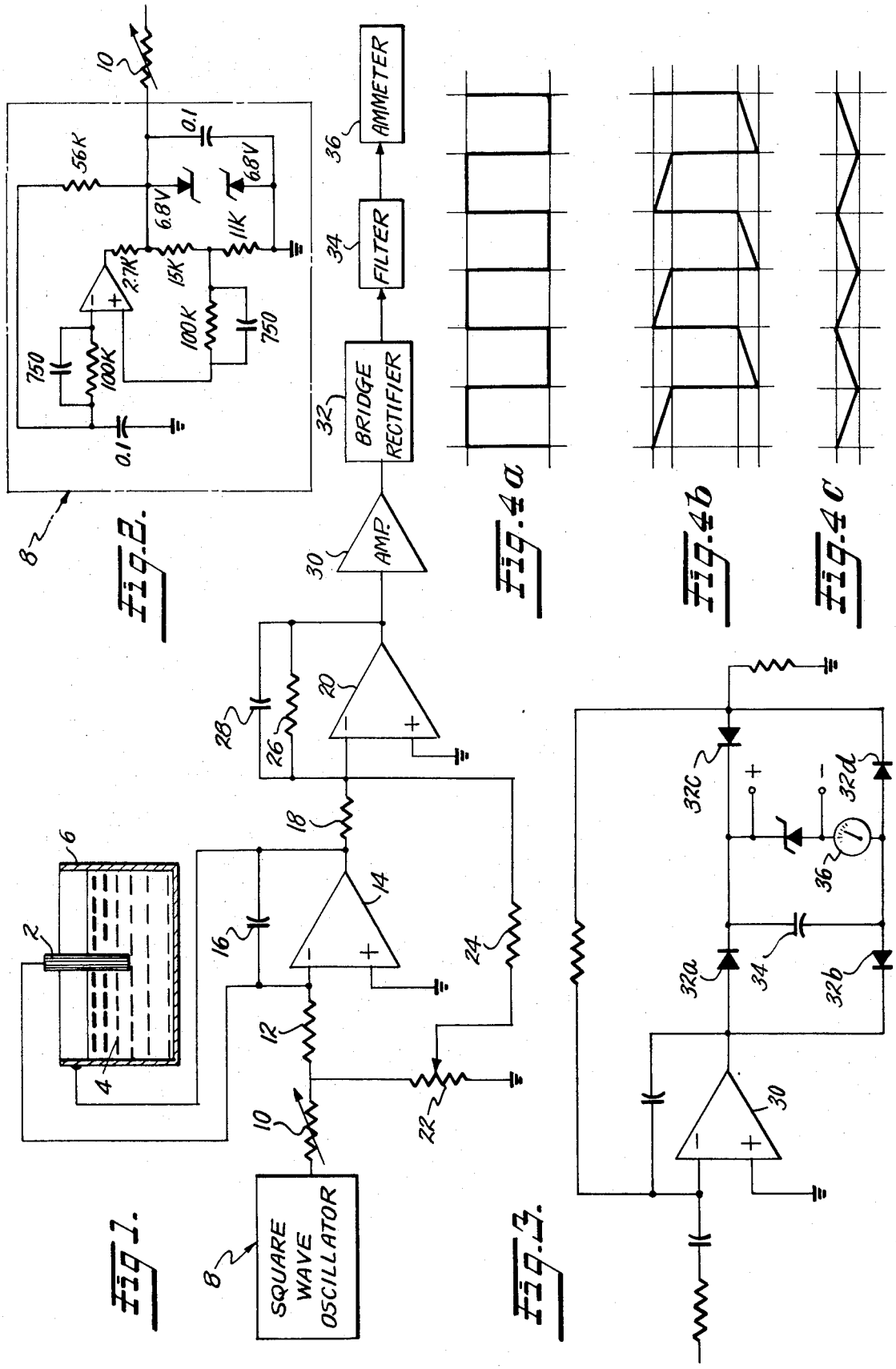

APPARATUS AND METHOD FOR TESTING THE AMOUNT OF DEPOSITION IN AN AQUEOUS SYSTEM

BACKGROUND OF THE INVENTION

1. Field of the Invention

This invention relates to the detection of the amount of material, such as scale, pitch, silt, etc., being deposited by an aqueous solution.

2. Description of the Prior Art

In the bleaching stage of paper manufacture, severe deterioration of the paper stock can result from the deposition of calcium carbonate in the processing apparatus. It is possible to reduce the amount of deposit by careful control of the various parameters of the process. However, there are a large number of such parameters which vary simultaneously, and it is quite difficult to optimally minimize the deposition over a period of time by manual observation and control. There have previously been no systems known to the applicants which allowed accurate measurement of the amount of deposition taking place over short periods of time.

There have previously been systems for measuring the dielectric constant of a capacitor automatically, where this dielectric constant was a variable function of some outside parameter. However, this dielectric measurement has been unavailable for the automatic measurement of levels of scale deposit in paper manufacture and other processes.

SUMMARY OF THE INVENTION

The invention involves a method of measuring deposition in aqueous systems, or other systems having a moderately high dielectric constant, and an apparatus for making such measurements, from which one can determine the amount of deposition taking place. The interface between an electrode and an aqueous system can be viewed as a resistance-capacitance network. The deposits which occur on the electrode act as dielectrics and change the dielectric constant of the capacitive portion of the resistance-capacitance network or the thickness of the dielectric. The vessel itself, or some other metallic or conductive element in contact with the liquid, is used as the other contact in the system, and the measurements are made between the electrode and this other contact. The impedance of the aqueous solution can be viewed as a resistance, leaving the capacitive effect at the electrode and the capacitive effect at the other contact as the only two capacitive effects in the system. These two capacitive effects appear in series. The capacitive effect taking place at the other contact is quite large, and the capacitive effect at the measurement electrode is small. By proper arrangement of various parameters, the system can be made to operate so that the small capacitance at the measurement electrode is the only variation that the measuring system sees. A symmetrical wave signal is impressed across the resistance-capacitance network, and the output signal is nulled to remove the resistance factor from the output. The resulting output signal is a ramp wave, having a slope magnitude proportional to the capacitance function. Rectification and filtering of this signal give a DC voltage which is a function of capacitance. This DC signal can be measured to provide an output value indicative of the level of capacitance, and, therefore, the amount of deposition taking place on the measurement electrode.

BRIEF DESCRIPTION OF THE DRAWING

FIG. 1 is a schematic block diagram of a system according to the present invention;

FIG. 2 is a schematic diagram of a preferred embodiment of the square wave oscillator of FIG. 1;

FIG. 3 is a schematic diagram of a preferred embodiment of the amplifier, bridge rectifier, filter and ammeter at the output of the system in the preferred embodiment; and FIGS. 4a, 4b and 4c are representative of wave forms occurring in the preferred embodiment of the invention.

DESCRIPTION OF THE PREFERRED EMBODIMENT

In FIG. 1, an electrode 2 is placed in an aqueous solution 4 within a vessel 6. This aqueous solution and vessel may be part of the bleaching process of a papermaking system, or may be in any other system in which the aqueous solution has a tendency to lay down a deposit. During the process being carried out, a deposit, such as scale, accumulates on the electrode 2. The amount of this deposit can be taken as indicative of the amount of deposit taking place throughout the system represented by vessel 6. By measuring the amount of deposit taking place on electrode 2, one obtains a good estimate of the amount of deposit taking place throughout the system, also the onset of the deposit.

Heat may be applied to the electrode to enable one to duplicate deposition occuring at a surface having a temperature higher than the bulk.

Conversely, a heat sink may be used to duplicate deposition occurring at cold surfaces. The suggested heating or cooling may be performed by any suitable means (not shown).

A square wave oscillator 8 applies a signal through a variable resistor 10 and an input resistor 12 to the minus input terminal of a differential amplifier 14. While a square wave oscillator is illustrated, it is to be understood that other shapes of signal may be used. For example, ramp or triangular waves. The plus input terminal of the differential amplifier 14 is grounded. A capacitor 16 is connected in feedback between the output terminal and the minus input terminal of differential amplifier 14 to cause the amplifier system to react in the manner of an integrator. Additionally, the cell including electrode 2, aqueous solution 4 and vessel 6 is connected in feedback relationship to the amplifier to serve as an additional RC series circuit in the feedback path of the amplifier.

When a square wave signal of the type shown in FIG. 4a is applied through resistor 12 to the differential amplifier, the output from the differential amplifier will be a somewhat sloping square wave of the sort shown in FIG. 4b as a result of the integrating action of the capacitor 16 and the capacitive effect of the cell in which electrode 2, aqueous solution 4, and vessel 6 are used. The amplitude of this signal is a function of the resistance of the network and the slope of the square wave crests is a function of the capacitance. The output of differential amplifier 14 is provided through an input resistor 18 to a second differential amplifier 20 at the minus terminal thereof. In order to balance out the resistive component of the waveform in FIG. 4b, a variably tapped resistor 22 is connected to receive the output signal from the square wave oscillator and to apply it through an input resistor 24 also to the minus input terminal of differential amplifier 20. The plus input of differential amplifier 20 is grounded. By varying the position of the variable tap on resistor 22 to minimize the amplitude of the output signal from differential amplifier 20, the resistive component of the input signal as illustrated in FIG. 4b can be eliminated to produce an output signal from differential amplifier 20 having a waveform as illustrated in FIG. 4c and consisting of only the sloping crests of the wave form of FIG. 4b. Differential amplifier 20 is provided with a feedback circuit comprising resistor 26 and capacitor 28 connected in parallel.

The signal as illustrated in FIG. 4c is fed from the output of differential amplifier 20 to the input of an amplifier 30 to provide an amplified signal to a bridge rectifier 32. This bridge rectifier converts the signal as shown in FIG. 4c into a pulsating direct current signal. The signal from bridge rectifier 32 is filtered by a filter element 34 and applied to an ammeter 36 in order to measure the value of the signal. Ammeter 36 can also be used in connection with variably tapped resistor 22 to null the output signal from differential amplifier 20.

FIG. 2 is a schematic diagram of the preferred embodiment of the square wave oscillator 8 as illustrated in FIG. 1. No special significance is attached to the construction of this square wave oscillator, and it would be within the scope of the invention to use any other appropriate square or other symmetrical wave oscillator for the same purpose. The variable resistor 10 is provided to give a ranging ability to the system so that the system can operate in a wide variety of actual environments.

FIG. 3 illustrates in greater detail the system including the amplifier 30, the bridge rectifier 32, the filter 34 and the ammeter 36. Bridge rectifier 32 comprises diode elements 32a, 32b, 32c and 32d. A recording meter may be used in parallel with or in place of ammeter 36. Although FIG. 3 represents a preferred embodiment of the output system of FIG. 1, other arrangements are possible within the scope of the invention according to the block diagram of FIG. 1.

In a preferred embodiment of the invention, the electrode 2 is chosen to eliminate electrochemical potential from the system as far as possible. This is preferably done by using an electrode of brass or stainless steel to maintain the system in a relatively passive state. In order to reduce the effect of changes in thermoconductivity of the electrode, it is preferable to use a small electrode surface, such as an electrode of approximately ⅛ inch diameter, thereby reducing the effect of a change in heat transfer characteristics of the electrode.

In a system constructed as illustrated in FIG. 1, an ammeter provides an indication of the extent of deposition occurring on electrode 2 in the fluid system containing aqueous solution 4, wherein the aqueous solution has a relatively high dielectric constant. This determination is made by measuring the capacitance at the interface between the electrode and fluid and comparing the dielectric constant obtained by this measurement to the known dielectric constant between the fluid and the clean electrode to determine the amount of deposition if any and to provide an output signal representative of this deposition.

While the invention has been described in connection with a bleaching stage of a paper-making process, the invention is not limited to such process, but can be used to measure deposition of any scale from a scale forming salt, such as calcium carbonate, calcium phosphate, calcium sulfate, magnesium carbonate, magnesium phosphate, magnesium sulfate, ferric hydroxide, ferric phosphate, calcium and magnesium oxalates, calcium and magnesium fatty acid soaps, such as calcium sterate, and also aluminum salts such as aluminum oxide, aluminum hydroxide, aluminum fatty acid soaps such as aluminum sterate; silts, siliceous materials, etc. This system may also be used for detecting the degree of organic deposits such as pitch, oil, greases, biological and chemical slimes.

The system may also be used to determine the degree of efficiency of various absorbants. For example, in return line condensate systems in steam generating equipment, film-forming amines are used to inhibit corrosion of metallic components. These amines actually form deposits on the metallic surface to prevent contact between the aqueous system and metallic conveyance means. The invention could be used to determine whether or not adequate filming is taking place using these additives.

We claim:

1. A method for detecting the degree of deposition of materials occurring in a fluid system having a moderately high dielectric constant onto a body in contact therewith, comprising:
    a. placing an electrode in contact with said fluid,
    b. measuring the capacitance at the interface between the electrode and the fluid, including the steps of:
        1. applying a symmetrical a.c. waveform signal across said interface;
        2. measuring the resultant current from said signal in accordance with the capacitance at said interface; and
        3. reducing the amplitude of said signal to only that of the capacitive component of said signal,
    c. comparing the capacitive value thus measured with a nominal capacitance value to determine any changes in the dielectric constant or thickness and the extent thereof existing at the interface between the electrode and the fluid, thereby ascertaining the deposition of said materials, if any, taking place on the electrode.

2. The method defined in claim 1 including the further step of rectifying, filtering and measuring the amplitude of said capacitance signal as a measure of the capacitance at said interface.

3. The method of claim 1 including the step of controlling the temperature of said electrode to thereby determine the rate of deposition at temperatures other than the normal temperature of said fluid system.

4. A method for detecting the degree of deposition of materials occurring in a fluid system having a moderately high dielectric constant onto a body in contact therewith, comprising:
    a. placing an electrode in contact with said fluid,
    b. measuring the capacitance at the interface between the electrode and the fluid, including the steps of:
        1. applying a square wave signal across said interface;
        2. sloping the crests of said signal in accordance with the capacitance at said interface; and 3. reducing the amplitude of said signal to only that of said sloping crests to produce a capacitance signal, c. comparing the capacitive value thus measured with a nominal capacitance value to determine any changes in the dielectric constant or thickness and the extent thereof existing at the interface between the electrode and the fluid, thereby ascertaining the deposition of said materials, if any, taking place on the electrode.

5. Apparatus for determining the degree of deposition of materials in a fluid system having a moderately high dielectric constant onto a body in contact therewith, comprising:

a first conductive electrode in contact with said fluid;

a second electrode in contact with said fluid;

circuit means connected to said electrodes for applying an electrical wave signal between said electrodes whereby said signal appears across the interface between said seond electrode and said fluid;

means connected to said circuit means for reducing the amplitude of said wave signal to only the capacitive component of said wave signal at said interface; and means connected to said circuit means for measuring the capacitance-produced change in shape to indicate the capacitance at said interface and thereby the degree of material deposition on said electrode.

6. An apparatus as defined in claim 5 wherein said modifying means includes a differential amplifier, said electrodes comprising a feedback circuit with respect to said amplifier.

7. An apparatus as defined in claim 5 wherein siad modifying means includes a differential amplifier having a variable resistance in a feedback circuit with respect to said amplifier.

8. An apparatus as defined in claim 5 wherein said applying means includes a square wave oscillator.

9. An apparatus as defined in claim 5 wherein said measuring means includes a bridge rectifier circuit, a filtering capacitor and ammeter in said bridge rectifier circuit.

10. An apparatus as defined in claim 5 wherein said first electrode is a vessel containing said fluid.

* * * * *